(12) United States Patent
Harada et al.

(10) Patent No.: US 8,481,618 B2
(45) Date of Patent: Jul. 9, 2013

(54) FIRE RETARDANT RESIN COMPOSITION

(75) Inventors: Tadakatsu Harada, Kanagawa (JP);
Yasuo Yamanaka, Tokyo (JP);
Hidekazu Yaginuma, Kanagawa (JP);
Yoshiyuki Nishio, Kyoto (JP); Dan Aoki, Kyoto (JP)

(73) Assignee: Ricoh Company, Ltd., Tokyo (JP)

( * ) Notice: Subject to any disclaimer, the term of this patent is extended or adjusted under 35 U.S.C. 154(b) by 257 days.

(21) Appl. No.: 12/999,412

(22) PCT Filed: Jun. 16, 2009

(86) PCT No.: PCT/JP2009/061273
§ 371 (c)(1),
(2), (4) Date: Dec. 16, 2010

(87) PCT Pub. No.: WO2010/001746
PCT Pub. Date: Jan. 7, 2010

(65) Prior Publication Data
US 2011/0105649 A1 May 5, 2011

(30) Foreign Application Priority Data

| Jul. 3, 2008 | (JP) | 2008-174535 |
| Jul. 3, 2008 | (JP) | 2008-174536 |
| Mar. 3, 2009 | (JP) | 2009-049701 |
| Mar. 3, 2009 | (JP) | 2009-049709 |

(51) Int. Cl.
*C08L 1/10* (2006.01)
(52) U.S. Cl.
USPC .......... 524/37; 524/115

(58) Field of Classification Search
USPC ............ 8/120; 252/601; 524/30, 56, 115, 524/37; 527/310; 528/398, 487; 536/62
See application file for complete search history.

(56) References Cited

U.S. PATENT DOCUMENTS

| 2,981,730 | A | * | 4/1961 | Martin et al. ............ 536/62 |
| 2,990,233 | A | * | 6/1961 | Pacsu et al. ............ 8/189 |
| 4,593,058 | A | * | 6/1986 | Talley ................. 524/122 |
| 7,645,823 | B2 | | 1/2010 | Horie et al. |
| 2004/0240495 | A1 | | 12/2004 | Akamatsu |
| 2005/0119411 | A1 | | 6/2005 | Terada et al. |
| 2006/0276582 | A1 | * | 12/2006 | Mochizuki et al. ....... 524/537 |
| 2007/0270527 | A1 | | 11/2007 | Horie et al. |
| 2008/0262151 | A1 | | 10/2008 | Ishii et al. |

FOREIGN PATENT DOCUMENTS

| GB | 1011118 | * 11/1965 |
| JP | 7-145201 | 6/1995 |
| JP | 2000-504767 | 4/2000 |
| JP | 2001-515124 | 9/2001 |

(Continued)

OTHER PUBLICATIONS

Singh R., et al., "Thermal and spectral studies on cellulose modified with various cresyldichlorothiophosphates," Thermochimica Acta, 1996, 289, 9-21.*

(Continued)

*Primary Examiner* — Liam Heincer
*Assistant Examiner* — Nicholas Hill
(74) *Attorney, Agent, or Firm* — Cooper & Dunham LLP

(57) ABSTRACT

A disclosed fire retardant resin composition includes a thermoplastic resin and a fire retardant. The fire retardant is formed of phosphorated polysaccharide that is formed by attaching thiophosphoric acid ester or phosphoric acid ester to a side chain of natural polysaccharide.

10 Claims, 1 Drawing Sheet

FOREIGN PATENT DOCUMENTS

| | | |
|---|---|---|
| JP | 2002-356579 | 12/2002 |
| JP | 2004-256809 | 9/2004 |
| JP | 2004-356579 | 12/2004 |
| JP | 2005-23260 | 1/2005 |
| JP | 2005-162870 | 6/2005 |
| JP | 2005-162871 | 6/2005 |
| JP | 2005-162872 | 6/2005 |
| JP | 2006-213916 | 8/2006 |
| JP | 2007-56247 | 3/2007 |
| JP | 2008-303288 | 12/2008 |
| JP | 2008-303289 | 12/2008 |
| JP | 2008-303290 | 12/2008 |
| JP | 2009-138138 | 6/2009 |
| JP | 2009-179712 | 8/2009 |
| WO | WO03/082987 A1 | 10/2003 |

OTHER PUBLICATIONS

Aoki, D. and Nishio, Y., "Functional versatility of cellulose derivatives having a hetero atom in the side chains: P-containing derivatives as flame resistant/retardant materials," The 237th ACS National Meeting, Salt Lake City, UT, Mar. 22, 2009.*

Umemoto K., et al., "Melt-moldable cellulose ester composition," Machine translation of Japanese-language foreign patent document JP2006213916. Machine translation performed at 05:30:39, Japanese Standard Time, on Oct. 23, 2012.*

International Search Report and Written Opinion in PCT/JP2009/061273.

Marvel, C.S. et al (1951) "Synthesis of Mixed Cellulose Esters Containing Phosphorus", Journal of Polymer Science, vol. 6, No. 3. pp. 351-358.

* cited by examiner

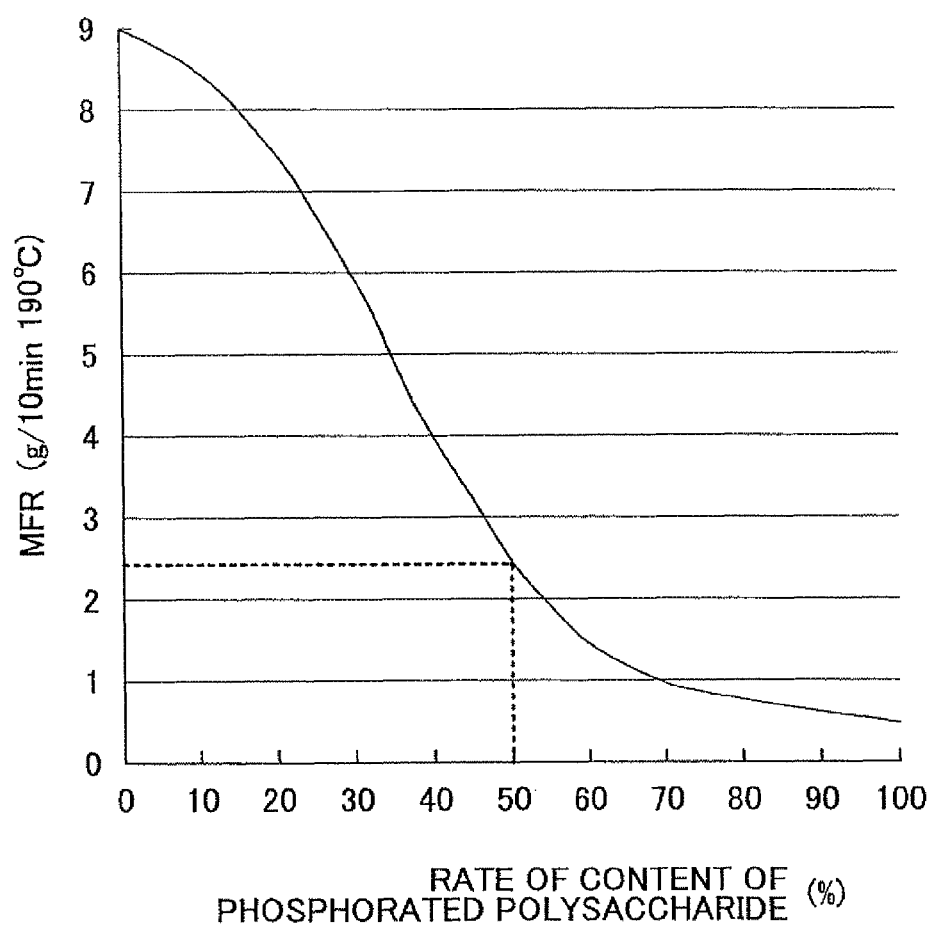

FIRE RETARDANT RESIN COMPOSITION

CROSS-REFERENCE TO RELATED APPLICATIONS

This patent application is a Section 371 national stage of international application No. PCT/JP2009/061273, filed on Jun. 16, 2009, which claims priority of Japanese Patent Applications Nos. 2008-174535, 2008-174536, 2009-049701 and 2009-049709 filed on Jul. 3, 2008, Jul. 3, 2008, Mar. 3, 2009 and Mar. 3, 2009, respectively, in the Japanese Patent Office.

TECHNICAL FIELD

The present invention generally relates to a fire retardant resin composition which has shock resistance, moldability, and fire retardancy, and can be used for a component of an image output apparatus such as a copier and a printer, and a component of an electric and electronic apparatus such as home electric appliances.

BACKGROUND ART

Conventionally, resin components (molded bodies) have been often used as components of an image output apparatus utilizing an electrophotographic technique, a printing technique, or an inkjet technique such as a copier and a laser printer, and as inner components of an electric and electronic apparatus such as a home electric appliance and of a vehicle. These components have been demanded to have fire retardancy as a resin material that prevents the spread of fire.

In particular, a copier includes a fixing unit that generates a high temperature. A resin material is also used around the fixing unit. Further, a copier includes a unit that generates a high voltage such as a charging unit and an alternating current power source unit at 100 V used as a power source unit. The maximum power consumption of these high voltage units is about 100 to 1500 W, and they are formed of a unit that uses a power source system of 100 V and 15 A. Such a copier represented mainly by a multifunction printer is a stationary (floor-type) electric and electronic apparatus. According to an international standard (IEC60950) related to the fire retardancy of a resin material, which is a safety standard of product devices, a component which might be an ignition source or cause fire is required to be covered with an enclosure component having fire retardancy "5V" of a UL94 standard (Underwriters Laboratories Inc., standard). A test method related to the UL94 standard "5V" is defined as "a burn test by a 500 W test flame" by an international standard IEC60695-11-20 (ASTM D5048). As components which constitute a body of a copier, a component inside the enclosure as well as the enclosure component is required to satisfy "V-2" of the UL94 standard.

There are several kinds of fire retardants. Among them, a bromine system fire retardant, a phosphoric acid system fire retardant, a nitrogen compound system fire retardant, a silicone system fire retardant, and an inorganic system fire retardant are generally used. Fire retardant mechanisms of these fire retardants have already been disclosed in several documents. Here, three fire retardant mechanisms that are particularly used often are briefly described.

First is a halogen system compound represented by a bromine system fire retardant. A halogen system compound functions as an oxidation reaction negative catalyst with respect to a burning flame, and thereby burning speed is reduced.

Second is a phosphoric acid system fire retardant or a silicone system fire retardant. By causing the silicone system fire retardant to bleed on a surface of the resin while burning or causing a dehydration reaction of the phosphoric acid system fire retardant in the resin, carbide (carbonaceous residue) is generated on the surface of the resin. By forming a thermal barrier coating film and the like by using the carbide, the burning of the resin is stopped.

Third is an inorganic system fire retardant such as magnesium hydrate and aluminum hydrate. By an endothermal reaction caused when these compounds are dissolved by burning of the resin and an evaporative latent heat of generated water, the entire resin is cooled down; thereby the burning of the resin is stopped.

On the other hand, a conventional resin material has been formed of a plastic material using petroleum as a raw material. In recent years, a biomass-derived resin using plants and the like as a raw material has been attracting attention. A biomass resource is formed of a resource of organisms such as plants and animals, for example, wood, corn, soybeans, fat of animals, and raw garbage. The biomass-derived resin is formed by using these biomass resources as a raw material. In general, there has been a biodegradable resin. Biodegradation is a function of degradation caused by microbes under a certain environment such as a temperature, humidity, and the like. Some of the biodegradable resins are petroleum-derived resins having a biodegradation function. As the biomass-derived resins, there are polylactic acid (PLA) formed of a chemical polymer using, as a monomer, lactic acid formed by fermenting carbohydrate of potatoes, sugarcane, corn, and the like; esterification starch including starch as a major component, microbiologic production resin (Poly Hydroxy Alkanoate (PHA)) which is polyester in which microbes are produced inside; PTT (Poly Trimethylene Terephthalate) formed by using 1.3 propanediol obtained by a fermentation method and petroleum-derived terephtal acid as raw materials; and the like.

The petroleum-derived raw materials are used currently; however, research has advanced to transition from the petroleum-derived materials to the biomass-derived resins in the future. For example, succinic acid as one of major raw materials of PBS (Poly Butylene Succinate) has been manufactured by using a plant-derived material. Among such biomass-derived resins, a product formed by applying polylactic acid having a high melting point of about 180° C., superior moldability, and capable of being supplied at a stable rate to the market, has been realized. However, the polylactic acid has a low glass transition point of 56° C., and thus has low heat resistance with a heat deforming temperature of about 55° C. Since the polylactic acid is a crystalline resin, its shock resistance is low and Izod impact strength is 1 to 2 kJ/m². Therefore, there has been a problem in that it is difficult to employ polylactic acid as a resistant member such as a component of an electric and electronic apparatus product. As a countermeasure for this problem, physical properties of the polylactic acid have been improved by forming a polymer alloy with a polycarbonate resin which is a petroleum-based resin, and the like. However, in this case, the rate (percent) of content of the petroleum-based resin has been increased while the rate of content of the biomass-derived resin has been decreased to about 50%. As a result, there has been a problem in that an effect against global warming for reducing the amount of fossil fuel to be used and the amount of carbon dioxide emission as a countermeasure for reducing the environmental impact is reduced to half.

For example, Patent Document 1 discloses a resin composition formed by blending 5 to 95 mass % of a polylactic acid resin (a), 5 to 95 mass % of an aromatic polycarbonate resin (b), and further, 0.1 to 50 parts by mass of a polymer compound (c) including an acrylic resin or a styrene resin unit which is grafted, and 0.1 to 50 parts by mass of a fire retardant (d) with respect to 100 parts by mass of a total of (a) and (b). In Patent Document 1, the fire retardant (d) is formed of one or more kinds selected from the bromine system fire retardant, phosphoric acid system fire retardant, nitrogen compound system fire retardant, silicone system fire retardant, and inorganic system fire retardant.

Although a biomass material is used as a countermeasure for global warming in Patent Document 1, its effect is reduced to half. Moreover, to obtain fire retardancy, 15 to 20 parts by mass of a phosphoric acid system fire retardant are required to be added with respect to 100 parts by mass of the resin. Since the phosphoric acid system fire retardant used here is formed by using a fossil resource, the rate of content of the used biomass material is further reduced.

Patent Document 2 discloses an electric and electronic component formed by molding a resin composition. The resin composition is formed by blending 1 to 350 parts by mass of a naturally-derived organic filler with respect to 100 parts by mass of a plant resource-derived resin. In this electric and electronic component, a polylactic resin is used as the plant resource-derived resin, and at least one kind selected from paper powder and wood powder is used as the naturally-derived organic filler, in which powder of waste paper is used as 50 mass % or more of the paper powder.

In Patent Document 2, the mechanical strength and the like of the resin are improved by adding the naturally-derived organic filler such as paper powder to polylactic acid. However, to obtain the fire retardancy, 23 to 29 parts by mass of a fire retardant formed by using a fossil resource such as a phosphoric acid system fire retardant are required to be added with respect to 100 parts by mass of polylactic acid. In this case, even when the resin material used as a base material is changed to a biomass material to reduce the environmental impact, the effect of reducing the environmental impact is reduced.

Patent Document 3 discloses a resin composition including at least one kind of organic polymer compound which exhibits biodegradability, a fire retardant-based additive including a phosphorated compound, and at least one kind of hydrolysis inhibitor which inhibits hydrolysis of the above-described organic polymer compound.

In Patent Document 3, however, to cause the organic polymer compound such as polylactic acid that exhibits biodegradability to be fire retardant, 30 to 60 parts by mass of the fire retardant-based additive including the phosphorated compound are required to be added with respect to 140 parts by mass of the organic polymer compound. Since the fire retardant-based additive including the phosphorated compound is formed by using a fossil resource as a raw material, the rate of content of the used biomass material is reduced.

In this manner, to cause a resin to be fire retardant, a large amount of fire retardant is required to be added. Normally, 10 to 30 parts by mass or as much as 50 parts by mass of fire retardant are required with respect to 100 parts by mass of the resin. When such a large amount of fire retardant is added to the resin, the rate of content of a used biomass material is reduced and the mechanical strength of the resin is reduced. When polylactic acid which originally has low impact strength is used, it becomes difficult to use the formed composition as it is as a consumer durable member.

As a technique to apply fire retardancy to a resin material formed by using a biomass material as a raw material, for example, Patent Document 4 discloses a manufacturing method of an organic-inorganic hybrid fire retardant cellulose material to solve the problem in that a conventional fire retardant material formed by using a petroleum material has a high impact on the environment. In the manufacturing method, acetyl cellulose (a) and 0.1 to 150 parts by mass of an alkoxysilane compound (b) with respect to 100 parts by mass of the acetyl cellulose (a) are blended to be evenly dispersed, an acetyl group is partially or completely detached, and the alkoxysilane compound is hydrolyzed and condensed.

However, the organic-inorganic hybrid fire retardant cellulose material obtained by this method includes acetyl cellulose and alkoxysilane compound simply kneaded together. According to a test result by a method pursuant to the UL94 burning test, the burning time of a test piece is extended but the test piece is completely burned out. Therefore, sufficient fire retardancy was not obtained. Moreover, as for moldability, although it is described that the formed resin can be molded, a specific embodiment regarding the moldability is not disclosed.

Further, in order to realize a fire retardant material which generates no toxic fumes such as dioxin, has fire retardancy, and is formed by using a biomass raw material, Patent Document 5 discloses a polymer composition including a polymer and a fire retardant which includes a polymer having a fire retardant compound as a side chain. Specifically, the fire retardant is formed by using a copolymer having a complex cyclic compound as a side chain, which complex cyclic compound has nitrogen as a heteroatom. As a part of a monomer of the polymer, a biogenic substance such as a nucleic acid base is used.

The fire retardant of Patent Document 5 has, as a side chain, the complex cyclic compound as a heteroatom in the polymer material. However, the polymer material as a base material is not a biomass material. Further, since the amount of additive is large, the environmental impact is not so small.

In such a conventional technique, a fire retardant is kneaded with a thermoplastic resin. By this method, the fire retardancy is realized; however, when the resin is to be used as a molded component through a molding process, there is a problem in that moldability is degraded and physical properties are reduced since fluidity of the resin is reduced due to a reduced affinity between the thermoplastic resin and fire retardant.

To solve the problem in that the dependency on a petroleum-based product is increased to obtain both fire retardancy and physical properties such as strength, Patent Document 6 discloses a fire retardant polyester resin composition. This fire retardant polyester resin composition is formed of 50 to 80 mass % of a naturally-derived biodegradable polyester resin (a) and 20 to 50 mass % of a thermoplastic polyester resin (b) in which an organic phosphorus compound is copolymerized. In specifics, polyethylene terephthalate (PET) or polybutylene succinate (PBS), in which an organic phosphorus compound is copolymerized, is blended with polylactic acid. However, polyethylene terephthalate (PET) of Patent Document 6 is formed of a petroleum-derived raw material, and succinic acid and butanediol serving as a raw material of polybutylene succinate are currently formed of a petroleum-derived raw material. Therefore, the composition disclosed in Patent Document 6 does not have much difference from a conventional fire retardant in respect of the rate of used biomass material. In this conventional technique, an organic phosphorus compound is copolymerized in a structure of the thermoplastic polyester resin, and the organic phosphorus compound is introduced in a main chain of the thermoplastic polyester resin. Due to the characteristics in realizing the fire retardancy by using the organic phosphorus compound, the fire retardancy is realized by detachment of phosphorus. However, since the organic phosphorus compound has been introduced in the main chain, it is not easily detached. Even when it is detached, the main chain of the thermoplastic polyester resin is broken. Thus, the amount of molecules is reduced and dripping is easily caused, which makes it difficult to obtain the fire retardancy. Consequently, even when a biomass-derived thermoplastic resin in which an organic phosphorus compound is copolymerized is used to realize the transition to less petroleum dependency, all of the physical properties and fire retardancy cannot be satisfied.

Non-patent Document 1 describes a case of chemically modifying phosphoric acid ester to be introduced in cellulose. However, there is only a description of a substance in which diethyl phosphoric acid ester is introduced in cellulose acetate. There is no description of a performance evaluation of the substance, in particular, an evaluation result related to fire retardant performance. Further, there is no description of kneading and polymerization with a thermoplastic resin.

Therefore, as a fire retardant resin composition which has low dependency on petroleum; includes a plant-derived material at a high rate; has a low environmental impact; and is provided with shock resistance, moldability, and fire retardancy, there has not been obtained a composition having a satisfactory performance yet, and further improvements and developments are required in the present circumstances.

[Patent Document 1] Japanese Patent Application Publication No. 2007-56247
[Patent Document 2] Japanese Patent Application Publication No. 2005-23260
[Patent Document 3] Japanese Patent Application Publication No. 2005-162872
[Patent Document 4] Japanese Patent Application Publication No. 2002-356579
[Patent Document 5] International Patent Publication No. 2003/082987
[Patent Document 6] Japanese Patent Application Publication No. 2004-256809
[Non-patent Document] C. S. Marvel et al., J. Polym. Sci., 6,351 (1951)

DISCLOSURE OF INVENTION

The present invention is made in view of the above-described circumstances to solve the conventional problems, and it is an object of at least one embodiment of the present invention to provide a fire retardant resin composition and molded body which have low dependency on petroleum, include a plant-derived material at a high rate, have a low environmental impact, and are provided with shock resistance, moldability, and fire retardancy.

According to one aspect of the present invention, a fire retardant resin composition includes a thermoplastic resin and a fire retardant. The fire retardant is formed of phosphorated polysaccharide that is formed by attaching thiophosphoric acid ester to a side chain of natural polysaccharide.

According to another aspect of the present invention, a fire retardant resin composition includes a thermoplastic resin and a fire retardant. The fire retardant is formed of phosphorated polysaccharide that is formed by attaching phosphoric acid ester to a side chain of natural polysaccharide.

BRIEF DESCRIPTION OF THE DRAWINGS

FIGURE is a graph showing a relationship between the rate of content of phosphorated polysaccharide and MFR (melt flow rate) at a molding temperature of 190° C.

BEST MODE FOR CARRYING OUT THE INVENTION (Fire Retardant Resin Composition)
A fire retardant resin composition of an embodiment of the present invention includes at least a thermoplastic resin and a fire retardant, and further includes other components as required.

—Thermoplastic Resin—
The thermoplastic resin to be used is not particularly limited. Either a petroleum-derived thermoplastic resin or a biomass material-derived resin can be appropriately selected to be used according to purpose. However, it is more preferable to use the biomass material-derived resin having a low environmental impact.

The biomass material-derived resin to be used is not particularly limited, and can be appropriately selected according to purpose. For example, aliphatic polyester and the like can be used. As the aliphatic polyester, for example, there are polylactic acid, polybutylene succinate, polycaprolactone, polytrimethylene terephthalate, microbially produced polyhydroxyalkanoate, and the like. These materials may be used alone or two or more kinds of these materials may be used in combination. Among these, it is particularly preferable to use polylactic acid in respect that (1) it is produced and distributed in a large amounts in the market and thus can be inexpensively obtained, (2) it can be molded by injection molding and has favorable fluidity, (3) it is a rigid material with high tensile strength and bending strength, (4) its heat resistance can be improved by controlling crystallinity, (5) physical properties matching the purpose can be obtained by kneading with another petroleum-derived resin, and (6) less energy input is required in the manufacture and the environmental impact is low because the manufacturing process is highly matured.

A resin (aliphatic polyester) other than polylactic acid can be appropriately selected to be used for similar reasons.

As the polylactic acid, for example, there are poly-L-lactic acid (PLLA), poly-D-lactic acid (PDLA), a random copolymer of L-lactic acid and D-lactic acid, a stereo complex of L-lactic acid and D-lactic acid, and the like. In addition, the polylactic acid may further include other copolymer components as required. These materials may be used alone or two or more kinds of these materials may be used in combination.

Among these materials, it is preferable to use polylactic acid having a lactic component with a high optical purity. It is preferable that an L-isomer or a D-isomer be included at a ratio of 80% or more in a total lactic component of the polylactic acid.

As such polylactic acid, polylactic acid formed by appropriately synthesizing materials or a commercialized product may be used. As the commercialized product, for example, there are TERRAMAC (registered trademark) TE-2000 (manufactured by UNITIKA LTD.), LACEA (registered trademark) H-100J (manufactured by Mitsui Chemicals, Inc.), VYLOECOL (registered trademark) BE-400 (manufactured by TOYOBO CO., LTD.), and the like.

As the thermoplastic resin, an aromatic polyester resin formed by using a biomass material as at least a part of a raw material may be used. As the aromatic polyester resin, polytrimethylene terephthalate formed by synthesizing 1.3 propanediol serving as a part of the raw material with a biomass material, and the like can be suggested.

As the thermoplastic resin, a biomass raw material-derived thermoplastic resin which further includes a petroleum-derived resin can be used. In this case, it is preferable to add 10 to 300 parts by mass of the petroleum-derived thermoplastic resin with respect to 100 parts by mass of the biomass material-derived thermoplastic resin.

The petroleum-derived thermoplastic resin is not particularly limited, and can be appropriately selected according to a purpose. For example, a polycarbonate resin, a polyethylene terephthalate resin, a polybutylene terephthalate resin, an acrylonitrile butadiene styrene resin (ABS resin), an acrylonitrile styrene resin (AS resin), methacrylate styrene resin (MS resin), a polystyrene resin, a polyamide resin, an acrylic resin, a polyacetal resin, and the like can be suggested. These resins may be used alone or two or more kinds of these resins may be used in combination. Among these resins, it is particularly preferable to use a polycarbonate resin and a polyethylene terephthalate resin.

The polycarbonate resin to be used is not particularly limited. A polycarbonate resin formed by appropriately synthesizing materials or a commercialized product may be used. As the commercialized product, for example there are LEXAN101 manufactured by SABIC Innovative Plastics Holding BV, and the like. The polyethylene terephthalate resin to be used is not particularly limited. A polyethylene terephthalate resin formed by appropriately synthesizing materials or a commercialized product may be used. As the commercialized product, for example, there are "Mitsui PETJ120" (manufactured by Mitsui Chemicals, Inc.), KURAPET KS750RC (manufactured by KURARAY CO., LTD.), PET TR-8550 (manufactured by TEIJIN LIMITED), and the like.

The number average molecular weight of the thermoplastic resin is preferably 50000 to 5000000, and more preferably 100000 to 2000000 as a standard polystyrene reduced value obtained by a gel permeation chromatography (GPC) analysis.

—Fire Retardant—

As the fire retardant, phosphorated polysaccharide obtained by attaching thiophosphoric acid ester or phosphoric acid ester to a side chain of natural polysaccharide is used.

The phosphorated polysaccharide is formed by using natural polysaccharide as a raw material. It is preferable to use at least one kind selected from cellulose, chitin, chitosan, starch, and these derivatives, as the natural polysaccharide. Among these, it is particularly preferable to use cellulose since it is preferable in view of future food problems to use a raw material other than food or a food residue, which is not dependent on a distribution process of food.

Since the cellulose has poor solvent dissolubility, it is preferable to use a cellulose derivative of which solvent dissolubility is improved by derivatizing cellulose.

As the cellulose derivative, for example, there are cellulose acetate, cellulose propionate, cellulose butyrate, cellulose acetate propionate, cellulose acetate butyrate, cellulose propionate butyrate, and the like. Among these, it is particularly preferable to use cellulose propionate since it exhibits favorable thermoplasticity.

It is preferable that thiophosphoric acid ester or phosphoric acid ester be attached to each of 2-position, 3-position, and 6-position hydroxyl groups or alkyl groups of the cellulose derivative to constitute a thiophosphoric acid ester structure or a phosphoric acid ester structure, respectively, in the phosphorated polysaccharide. It is because the rate of content of phosphorus in the phosphorated polysaccharide can be increased, which is preferable since fire retardancy is enhanced. As shown in chemical expression (1) below, the cellulose derivative includes hydroxyl groups or alkyl groups at 2-position, 3-position, and 6-position. When thiophosphoric acid ester or phosphoric acid ester is to be attached to the hydroxyl groups or alkyl groups, it is likely to be attached in an order of the 6-position >3-position >2-position due to an effect of steric hindrance. Thus, the thiophosphoric acid ester or phosphoric acid ester is hardly attached to the 2-position hydroxyl group or alkyl group. Therefore, before the thiophosphoric acid ester is attached to the hydroxyl group or alkyl group, the 6-position hydroxyl group or alkyl group is protected by a trityl group (—C($C_6H_5$)$_3$) and then the thiophosphoric acid ester is attached to the 2-position and 3-position hydroxyl groups or alkyl groups. Subsequently, the protection of the 6-position trityl group is detached (deprotected) in an organic solvent under an acid condition, and then the thiophosphoric acid ester is attached to the 6-position hydroxyl group or alkyl group. In this manner, the thiophosphoric acid ester can be introduced to all of the 2-position, 3-position, and 6-position hydroxyl groups or alkyl groups.

Next, the case where the phosphoric acid ester is to be attached is described. In the same manner, before the phosphoric acid ester is attached to the hydroxyl group or alkyl group, the 6-position hydroxyl group or alkyl group is protected by a trityl group (—C($C_6H_5$)$_3$) and then the phosphoric acid ester is attached to the 2-position and 3-position hydroxyl groups or alkyl groups. Subsequently, the protection of the 6-position trityl group is detached (deprotected) in an organic solvent under an acid condition, and then the phosphoric acid ester is attached to the 6-position hydroxyl group or alkyl group. In this manner, the phosphoric acid ester can be introduced to all of the 2-position, 3-position, and 6-position hydroxyl groups or alkyl groups. As the organic solvent used for detaching (deprotecting) the trityl group, a solvent such as acetone, tetrahydrofuran, and dichloromethane can be used. Further, as the deprotection test reagent, acid such as hydrochloric acid, p-toluene sulfonic acid, and boron trifluoride can be used. A protecting group to be used is not limited to the trityl group. Any protecting group that can be used as a protecting group of a hydroxyl group may be used, such as a p-methoxyphenyl diphenylmethyl group.

[Chemical expression 1]

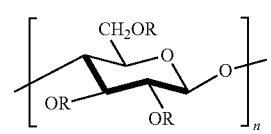

In chemical expression 1, n denotes a number of polymerization.

As the thiophosphoric acid ester introduced to a side chain of the natural polysaccharide or its derivative (for example, cellulose or its derivative), for example, there are methyl thiophosphoric acid, ethyl thiophosphoric acid, dimethyl thiophosphoric acid, diethyl thiophosphoric acid, and the like. Among these, it is particularly preferable to use dimethyl thiophosphoric acid or diethyl thiophosphoric acid since either has less steric hindrance and does not deteriorate reactivity when attaching thiophosphoric acid ester to a side chain of the natural polysaccharide or its derivative, and moreover, the phosphorated polysaccharide can be easily manufactured and high fire retardancy can be obtained.

As the phosphoric acid ester introduced to a side chain of the natural polysaccharide or its derivative (for example, cellulose or its derivative), for example, there are methyl phosphoric acid, ethyl phosphoric acid, dimethyl phosphoric acid, diethyl phosphoric acid, methylphenyl phosphoric acid, ethylphenyl phosphoric acid, diphenyl phosphoric acid, methyl phosphorous acid, ethyl phosphorous acid, and the like. Among these, it is particularly preferable to use dimethyl phosphoric acid or diethyl phosphoric acid since it has less steric hindrance and does not deteriorate reactivity, and moreover, the phosphorated polysaccharide can be easily manufactured and high fire retardancy can be obtained.

The phosphorated polysaccharide preferably has a number average molecular weight of 10000 to 100000, and more preferably 50000 to 300000. In these value ranges, the fire retardancy and shock resistance can be improved, and moldability can be improved. When the number average molecular weight is less than 10000, the shock resistance may be reduced. When the number average molecular weight is more than 1000000, fluidity of a molten resin is decreased in a molding process, which may cause a molding defect such as a sink mark.

The rate of content of phosphorus in the phosphorated polysaccharide is preferably 1 to 20 mass %, and more preferably 3 to 10 mass %. In these preferable value ranges, a stable fire retardant effect can be obtained. When the rate of content of phosphorus is less than 3 mass %, the UL94 fire retardancy standard "V-2" can be satisfied; however, the burning time or an afterflame time becomes long. When the rate of content of phosphorus becomes less than 1 mass %, the fire retardancy is reduced, and moreover, one or two test pieces among a set of 5 test pieces used in a burning test under the UL94 standard may continue burning for a prescribed time or longer, or a total burning time of the five test pieces may be equal to or more than the prescribed time. Thus, there are cases where the fire retardancy "V-2" of the UL94 standard cannot be satisfied. By the above-described reasons, it is effective to set the rate of content of phosphorus to be 1 mass % or more.

Meanwhile, in the cellulose skeleton shown by chemical expression (1), as for R at each of three parts (2-position, 3-position, and 6-position), a thiophosphoric acid group or phosphoric acid group can be stably introduced by setting synthesis conditions when the rate of content of phosphorus is less than about 10 mass %, due to the characteristics of a substitution degree of the introduction. However, when the rate of content of phosphorus is more than 10 mass %, such a starting substance that can detach all of the Rs is required to be refined, and in addition, such a synthesis condition that allows selective introduction of a thiophosphoric acid group to all the parts (positions) of the cellulose skeleton, or such a synthesis condition that allows selective introduction of a phosphoric acid group to all the parts (positions) of the cellulose skeleton is required to be set. The rate of content of phosphorus, 20 mass %, of the phosphorated polysaccharide synthesized with an optimal starting substance and synthesis condition is an upper limit value of the rate of content of phosphorus as described below. By the above-described reason, it is effective that the rate of content of phosphorus be 20 mass % or less.

The following are examples of rates of content of phosphorus in the case where thiophosphoric acid ester is attached to the maximum of three parts (2-position, 3-position, and 6-position) of R in the cellulose skeleton shown by chemical expression (1).

Methylthiophosphorylation (R=PS(OH)(OCH$_3$)): The rate of content of phosphorus is 18.9 mass %

Ethylthiophosphorylation (R=PS(OH)(OCH$_2$CH$_3$)): The rate of content of phosphorus is 17.4 mass %

Dimethylthiophosphorylation (R=PS(OCH$_3$)$_2$): The rate of content of phosphorus is 17.4 mass %

Diethylthiophosphorylation (R=PS(OCH$_2$CH$_3$)$_2$): The rate of content of phosphorus is 15.0 mass %

Further, following are examples of rates of content of phosphorus in the case where phosphoric acid ester is attached to the maximum of three parts (2-position, 3-position, and 6-position) of R in the cellulose skeleton shown by chemical expression (1).

Methylphosphorylation (R=PO(OH)(OCH$_3$)): The rate of content of phosphorus is 22.0 mass %

Ethylphosphorylation (R=PO(OH)(OCH$_2$CH$_3$)): The rate of content of phosphorus is 19.1 mass %

Dimethylphosphorylation (R=PO(OCH$_3$)$_2$): The rate of content of phosphorus is 19.1 mass %

Diethylphosphorylation (R=PO(OCH$_2$CH$_3$)$_2$): The rate of content of phosphorus is 16.3 mass %

It is preferable that a mass ratio (A:B) between the thermoplastic resin (A) and the phosphorated polysaccharide (B) be 50:50 to 90:10, and more preferably 50:50 to 80:20. When the rate of content of the phosphorated polysaccharide is more than 50 mass %, the property of thermoplasticity is degraded and fluidity of a molten resin is reduced in a molding process, which may cause a molding defect such as a sink mark. When the rate of content of the phosphorated polysaccharide is less than 10 mass %, an effect of fire retardancy may be degraded.

When the rate of content of the phosphorated polysaccharide is more than 50 mass %, an MFR (g/10 min) at a molding temperature of 190° C. becomes 2 g/10 min or less, a property of thermoplasticity is degraded, and fluidity of a molten resin is reduced in a molding process, which may cause a molding defect such as a sink mark (see FIG. 1). On the other hand, when the rate of content of the phosphorated polysaccharide is less than 10 mass %, an effect of the fire retardancy is reduced; therefore, the fire retardancy "V-2" of the UL94 standard may not be satisfied.

—Other Components—

The above-described other components to be included in the fire retardant resin composition are not particularly limited. An appropriate component can be selected from known additives used for a resin composition according to a purpose. For example, there are fire retardants other than phosphorated polysaccharide, a fire retardant assistant, a compatibilizer, a plasticizer, an antioxidant, an ultraviolet absorber, a processing aid, an antistatic agent, a colorant, a hydrolysis inhibitor, a crystal nucleating agent, and the like.

These components can be used at an amount appropriately selected in such a range that does not spoil an effect of the present invention. These components may be used alone or two or more kinds of these components may be used in combination.

As the hydrolysis inhibitor, for example, there are carbodiimide modified isocyanate, organic phosphate metallic salt compound, tetraisocyanate silane, monomethyl isocyanate silane, alkoxysilane, styrene 2-isopropenyl-2-oxazoline copolymer, 2,2-m-phenylenebis(2-oxazoline), and the like.

As the crystal nucleating agent, for example, talc system nucleating agent, a nucleating agent formed of a metallic salt system material having a phenyl group, a nucleating agent formed of a benzoyl compound system, and the like are preferably suggested. Other known crystal nucleating agents such as lactate, benzoate, silica, and phosphoric acid ester salt system may be used as well.

As a fire retardant other than the phosphorated polysaccharide, for example, there are petroleum-based phosphoric acid ester fire retardants, and the like. As the petroleum-based phosphoric acid ester fire retardants, for example, there are aromatic phosphoric acid ester fire retardants, aromatic condensed phosphoric acid ester retardants, and the like. As the aromatic phosphoric acid ester retardants, for example, there are triphenyl phosphate, trixylenyl phosphate, tricresyl phenyl phosphate, cresyldi2,6-xylenyl phosphate, and the like. As the aromatic condensed phosphoric acid ester fire retardants, for example, there are 1,3-phenylenebis(diphenylphosphate), 1,3-phenylenebis(di-2,6-xylenylphosphate), bisphenol A bis(diphenylphosphate), and the like.

As the fire retardant assistant, polytetrafluoroethylene, a polytetrafluoroethylene resin, a fluorine resin, a perfluoro alkanesulfonic acid alkali metallic salt, and the like can be used as a dripping inhibitor.

(Molded Body)

A molded body of an embodiment of the present invention is not particularly limited except that it is formed by molding the fire retardant resin composition of an embodiment of the present invention. A shape, a structure, a size, and the like of the molded body can be appropriately selected according to purpose.

A method for molding a molded body is not particularly limited, and can be appropriately selected from known methods according to a purpose. For example, film molding, extrusion molding, injection molding, blow molding, compression molding, transfer molding, calendar molding, heat molding, flow molding, laminate molding, and the like can be employed. Among these methods, it is preferable to employ one of the film molding, extrusion molding, and injection molding, and it is especially preferable to employ the injection molding when a molded body is to be used as a component of an electric and electronic apparatus of an image output apparatus such as a copier and a printer, and of a home electric appliance.

For example, to obtain a housing member such as an exterior cover and the like of a copier by molding, a mold which allows temperature setting by a water temperature controller is used by using an electric injection molding apparatus with clamp capacity of 350 tons. By performing molding with molding conditions of a molding temperature at 40° C., an injection pressure at 90 MPa, and an injection speed at 10 mm/sec, a molded body which satisfies an exterior and a size can be obtained.

—Method for Analyzing Presence or Absence of Phosphorated Polysaccharide Included in Molded Body—

Polylactic acid and diethyl thiophosphorylated cellulose propionate or diethyl phosphorylated cellulose propionate are blended together, as the thermoplastic resin and phosphorated polysaccharide, respectively, to obtain a molded body formed of a fire retardant resin composition. The presence or absence of phosphorated polysaccharide included in the molded body is determined by, for example, dissolving a part of the molded body in chloroform, filtering and obtaining insoluble matter, and performing cleaning by using methanol, drying, and a measurement using an infrared spectrophotometer (FT-IR8600CPs manufactured by SHIMADZU CORPORATION, KBr method, 100 times of integration, and a resolution performance of 4 [1/cm]).

Further, the analysis of the presence or absence of phosphorated polysaccharide in the molded body can be easily performed by dissolving the insoluble matter in pyridine and performing measurement of P-NMR (Phosphorus Nuclear Magnetic Resonance) using a nuclear magnetic resonance apparatus (INOVA300 manufactured by Varian, Inc.)

By changing the kind of solvent to be used according to a combination of the thermoplastic resin and phosphorated polysaccharide, the presence or absence of phosphorated polysaccharide in the molded body can be analyzed by the above-described method.

—Applications—

A molded body of an embodiment of the present invention has shock resistance, moldability, and fire retardancy, and can be favorably used as a component used in an image output apparatus using an electrophotographic technique such as a copier and a laser printer, a printing technique, or an inkjet technique, an inner component of an electric and electronic apparatus such as a home electric appliance and a vehicle, and the like.

[Embodiments]

Embodiments of the present invention are described below, however, the present invention is not limited to these embodiments.

In embodiments and comparison examples below, "a number average molecular weight of a thermoplastic resin", "a rate of content of phosphorus in phosphorated polysaccharide", "a rate of content of a plant-derived material used in a fire retardant resin composition", and "a number average molecular weight of phosphorated polysaccharide" were measured as follows.

<Measurement of a Number Average Molecular Weight of a Thermoplastic Resin>

The number average molecular weight of a thermoplastic resin was obtained by dissolving a resin in a tetrahydrofurane (THF) solvent with a concentration of 0.1 mass % by using HLC8220GPC manufactured by TOSOH CORPORATION and employing a gel permeation chromatography (GPC) analysis to obtain a standard polystyrene reduced value as the number average molecular weight.

<Measurement of a Rate of Content of Phosphorus in Phosphorated Polysaccharide>

The rate of content of phosphorus in phosphorated polysaccharide was measured by measuring P-NMR using a nuclear magnetic resonance apparatus (INOVA300 manufactured by Varian, Inc.).

<Measurement of a Rate of Content of a Plant-Derived Material Used in a Fire Retardant Resin Composition>

Phosphorated polysaccharide is formed by using natural polysaccharide as a part of a raw material and a petroleum-derived compound as a raw material used for derivatization. The rate of the natural polysaccharide included in phosphorated polysaccharide (B) can be calculated by the rate of content of phosphorus included in the phosphorated polysaccharide (B) and the degree of substitution of a polysaccharide derivative used as a raw material. This rate is defined as the rate of content of the plant-derived material in the phosphorated polysaccharide (B).

Examples of a method for calculating the rate of content of the plant-derived material are described below.

For example, 90 parts by mass of polylactic acid and 10 parts by mass of diethyl thiophosphorylated cellulose propionate are blended as the thermoplastic resin (A) and the phosphorated polysaccharide (B), respectively, to obtain a fire retardant resin composition. The rate of content of a plant-derived material included in the diethyl thiophosphorylated cellulose propionate is calculated to be 42 mass % according to the rate of content of a plant-derived material of polylactic acid being 100%, the substitution degree of cellulose propionate used as a raw material and expressed by following chemical expression 2 being 2.42, and the rate of content of phosphorus in the obtained diethyl thiophosphorylated cellulose propionate being 4.3 mass %. By the following mathematical expression, the rate of content of a plant-derived material used in the fire retardant resin composition is calculated as being 94.2 mass %.

The rate of content of a plant-derived material in a fire retardant resin composition=(the rate of content of a plant-derived material included in polylactic acid)×0.9+(the rate of content of a plant-derived material in diethyl thiophosphorylated cellulose propionate)×0.1=100×0.9+42×0.1=94.2 mass %.

For example, 90 parts by mass of polylactic acid and 10 parts by mass of diethyl phosphorylated cellulose propionate are blended as the thermoplastic resin (A) and the phosphorated polysaccharide (B), respectively, to obtain a fire retardant resin composition. The rate of content of a plant-derived material included in the diethyl phosphorylated cellulose propionate is calculated to be 44 mass % according to the rate of content of a plant-derived material of polylactic acid being 100%, the substitution degree of cellulose propionate used as a raw material and expressed by following chemical expression 2 being 2.42, and the rate of content of phosphorus in the obtained diethyl phosphorylated cellulose propionate being 3.2 mass %. By the following mathematical expression, the rate of content of a plant-derived material used in the fire retardant resin composition is calculated as being 94.4 mass %. The rate of content of a plant-derived material in a fire retardant resin composition=(the rate of content of a plant-derived material included in polylactic acid)×0.9+(the rate of content of a plant-derived material in diethyl phosphorylated cellulose propionate)×0.1=100×0.9+44×0.1=94.4 mass %.

[Chemical expression 2]

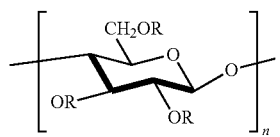

In chemical expression 2, n denotes the number of polymerization. In the case of cellulose propionate, R corresponds to $COCH_2CH_3$, and the propionate substitution degree is 2.42.

<Measurement of a Number Average Molecular Weight of Phosphorated Polysaccharide>

Phosphorated polysaccharide was dissolved in chloroform or dimethylformamide (DMF) to be at a normal concentration, and then the number average molecular weight of the phosphorated polysaccharide was measured by a GPC (Gel Permeation Chromatography) method.

(Embodiment 1)

<Manufacture of Phosphorated Polysaccharide (B)>

—Synthesis of Diethyl Thiophosphorylated Cellulose Propionate (B1)—

Cellulose propionate manufactured by Scientific Polymer products, Inc. was refined and used as a starting substance.

Diethyl thiophosphoric acid chloride (manufactured by SIGMA-ALDRICH Corp.) was used as an attack test reagent while pyridine (manufactured by Nacalai Tesque, Inc.) was used as a solvent.

5 g of cellulose propionate were added to 100 ml of pyridine and dissolved by stirring in a flask. The flask was then immersed in water having a controlled temperature of 40° C., and 12 eq/AGU (Anhydroglucose unit) of an attack test reagent mixed with the same amount of chloroform ($CHCl_3$) in a dry nitrogen flow was slowly dropped in drops into the flask; thereby a reaction was started. After 24 hours, the mixture was dropped in drops into excess distilled water and reprecipitated, and thereby the reaction was finished. After repeating cleaning by using propanol, acetone was added and stirred to be dissolved again. Subsequently, after an impurity was removed by filtering the solution, distilled water was slowly dropped in drops into the solution while stirring the solution. After acetone in the solution was removed by vacuum concentration of the solution, the solution underwent freeze-drying. In this manner, diethyl thiophosphorylated cellulose propionate (B1) was synthesized.

The rate of content of phosphorus included in the obtained diethyl thiophosphorylated cellulose propionate was 4.3 mass %; the substitution degree was 2.1 for a propionyl group, 0.5 for a hydroxyl group, and 0.4 for a thiophosphoric acid group; the number average molecular weight Mn was 85000, the weight-average molecular weight Mw was 232000, and the variance Mw/Mn was 2.73.

—Manufacture of a Fire Retardant Resin Composition—

As the thermoplastic resin (A), polylactic acid (A1) (LACEA H-100J manufactured by Mitsui Chemicals, Inc., with a number average molecular weight of 52200) was prepared. 90 parts by mass of this polylactic acid and 10 parts by mass of the diethyl thiophosphorylated cellulose propionate (B1) were dry-blended. Then, by using a biaxial kneading extruder, the obtained mixture underwent melt kneading at a kneading temperature of 180° C., and thereby a molding pellet (P1) in a size of about 3 mm square was manufactured.

(Embodiment 2)

<Manufacture of Phosphorated Polysaccharide (B)>

—Synthesis of Dimethyl Thiophosphorylated Cellulose Propionate (B2)—

Cellulose propionate manufactured by Scientific Polymer products, Inc. was refined and used as a starting substance.

Dimethyl thiophosphorylated cellulose propionate (B2) was manufactured by a similar method to embodiment 1 by using dimethyl thiophosphoric acid chloride (manufactured by SIGMA-ALDRICH Corp.) as an attack test reagent, and using pyridine (manufactured by Nacalai Tesque, Inc.) as a solvent.

The rate of content of phosphorus included in the obtained dimethyl thiophosphorylated cellulose propionate was 3.7 mass %, the number average molecular weight Mn was 83000, the weight-average molecular weight Mw was 220000, and the variance Mw/Mn was 2.65.

—Manufacture of a Fire Retardant Resin Composition—

As the thermoplastic resin (A), the polylactic acid (A1) (LACEA H-100J manufactured by Mitsui Chemicals, Inc., with a number average molecular weight of 52200) was prepared. A molding pellet (P2) in a size of about 3 mm square was manufactured by a similar method to that of embodiment 1 by mixing 90 parts by mass of this polylactic acid and 10 parts by mass of the dimethyl thiophosphorylated cellulose propionate (B2).

(Embodiment 3)

<Manufacture of Phosphorated Polysaccharide (B)>

—Synthesis of Diethyl Thiophosphoric Cellulose Acetate (B3)—

Cellulose acetate manufactured by Scientific Polymer products, Inc. was refined and used as a starting substance. Diethyl thiophosphorylated cellulose acetate (B3) was synthesized by a similar method to embodiment 1, by using diethyl thiophosphoric acid chloride (manufactured by SIGMA-ALDRICH Corp.) as an attack test reagent and pyridine (manufactured by Nacalai Tesque, Inc.) as a solvent.

The rate of content of phosphorus included in the obtained diethyl thiophosphorylated cellulose acetate was 4.8 mass %, the number average molecular weight Mn was 54000, the weight-average molecular weight Mw was 145000, and the variance Mw/Mn was 2.68.

—Manufacture of a Fire Retardant Resin Composition—

90 parts by mass of the polylactic acid (A1) (LACEA H-100J manufactured by Mitsui Chemicals, Inc., with a number average molecular weight of 52200) as the thermoplastic resin (A) and 10 parts by mass of the diethyl thiophosphorylated cellulose acetate (B3) were mixed; thereby a molding pellet (P3) in a size of about 3 mm square was manufactured by a similar method to that of embodiment 1.

(Embodiment 4)

<Manufacture of Phosphorated Polysaccharide (B)>

—Synthesis of Dimethyl Thiophosphorylated Cellulose Acetate (B4)—

Cellulose acetate manufactured by Scientific Polymer products, Inc. was refined and used as a starting substance. Dimethyl thiophosphorylated cellulose acetate (B4) was synthesized by a similar method to embodiment 1, by using dimethyl thiophosphoric acid chloride (manufactured by SIGMA-ALDRICH Corp.) as an attack test reagent and pyridine (manufactured by Nacalai Tesque, Inc.) as a solvent.

The rate of content of phosphorus included in the obtained dimethyl thiophosphorylated cellulose acetate was 4.1 mass %, the number average molecular weight Mn was 51000, the weight-average molecular weight Mw was 128000, and the variance Mw/Mn was 2.51.

—Manufacture of a Fire Retardant Resin Composition—

90 parts by mass of the polylactic acid (A1) (LACEA H-100J manufactured by Mitsui Chemicals, Inc., with a number average molecular weight of 52200) as the thermoplastic resin (A) and 10 parts by mass of the dimethyl thiophosphorylated cellulose acetate (B4) were mixed; thereby a molding pellet (P4) in a size of about 3 mm square was manufactured by a similar method to that of embodiment 1.

(Embodiment 5)

—Manufacture of a Fire Retardant Resin Composition—

50 parts by mass of polylactic acid (A1) (LACEA H-100J manufactured by Mitsui Chemicals, Inc., with a number average molecular weight of 52200) as the thermoplastic resin (A) and 50 parts by mass of the diethyl thiophosphorylated cellulose propionate (B1) manufactured in embodiment 1 were mixed, and thereby a molding pellet (P5) in a size of about 3 mm square was manufactured by a similar method to that of embodiment 1.

(Embodiment 6)

—Manufacture of a Fire Retardant Resin Composition—

45 parts by mass of the polylactic acid (A1) (LACEA H-100J manufactured by Mitsui Chemicals, Inc., with a number average molecular weight of 52200) as the thermoplastic resin (A), 45 parts by mass of a polycarbonate resin (LEXAN101 manufactured by SABIC Innovative Plastics Holding BV, with a number average molecular weight of 21400) as a thermoplastic resin (A2), and 10 parts by mass of diethyl thiophosphorylated cellulose propionate (B1) manufactured in embodiment 1 were mixed; thereby a molding pellet (P6) in a size of about 3 mm square was manufactured by a similar method to that of embodiment 1.

(Embodiment 7)

—Manufacture of a Fire Retardant Resin Composition—

After 90 parts by mass of a polyethylene terephthalate resin (A3) as the thermoplastic resin (A) and 10 parts by mass of diethyl thiophosphoric cellulose propionate (B1) synthesized in embodiment 1 as the phosphorated polysaccharide (B), to be 100 parts by mass, were dry-blended, a molding pellet (P7) in a size of about 3 mm square was manufactured by a similar method to that of embodiment 1.

Here, "Mitsui PETJ120" manufactured by Mitsui Chemicals, Inc., with a number average molecular weight of 38300 was used as the polyethylene terephthalate resin (A3) used as the thermoplastic resin (A).

(Embodiment 8)

<Manufacture of Phosphorated Polysaccharide (B)>

—Synthesis of Phosphoric Acid Esterified Cellulose Propionate (B5)

Cellulose propionate manufactured by Scientific Polymer products, Inc. was refined and used as a starting substance.

Diethyl phosphoric acid chloride (manufactured by SIGMA-ALDRICH Corp.) was used as an attack test reagent while pyridine (manufactured by Nacalai Tesque, Inc.) was used as a solvent.

5 g of cellulose propionate were added to 100 ml of pyridine and dissolved by stirring in a flask. The flask was then immersed in water having a controlled temperature of 40° C., and 12 eq/AGU of the attack test reagent mixed with the same amount of chloroform ($CHCl_3$) in a dry nitrogen flow was slowly dropped in drops into the flask, and thereby a reaction was started. After 24 hours, the mixture was dropped in drops into excess distilled water and reprecipitated, and thereby the reaction was finished. After repeating cleaning by using propanol, acetone was added and stirred to be dissolved. Subsequently, after an impurity was removed by filtering the solution, distilled water was slowly dropped in drops into the solution. After acetone in the solution was removed by vacuum concentration of the solution, the solution underwent freeze-drying. In this manner, phosphoric acid esterified cellulose propionate (B5) was synthesized.

The rate of content of phosphorus included in the obtained phosphoric acid esterified cellulose propionate was 3.8 mass %; the substitution degree was 2.1 for a propionyl group, 0.5 for a hydroxyl group, and 0.4 for a phosphoric group; the number average molecular weight Mn was 84000; the weight-average molecular weight Mw was 245000; and the variance Mw/Mn was 2.92.

—Manufacture of a Fire Retardant Resin Composition—

90 parts by mass of the polylactic acid resin (A1) (LACEA H-100J manufactured by Mitsui Chemicals, Inc., with a number average molecular weight of 52200) as the thermoplastic resin (A) and 10 parts by mass of the phosphoric acid esterified cellulose propionate (B5) synthesized as described above, to be 100 parts by mass, were dry-blended. Then, by using a biaxial kneading extruder, the obtained mixture underwent melt kneading at a kneading temperature of 180° C., thereby a molding pellet (P8) in a size of about 3 mm square was manufactured.

(Embodiment 9)

<Manufacture of Phosphorated Polysaccharide (B)>

—Synthesis of Phosphoric Acid Esterified Cellulose Acetate (B6)—

Phosphoric acid esterified cellulose acetate (B6) was synthesized by a similar method to embodiment 8 by using cellulose acetate (manufactured by SIGMA-ALDRICH Corp.) as a starting substance, using diethyl phosphoric acid chloride (manufactured by SIGMA-ALDRICH Corp.) as an attack test reagent, and using pyridine (manufactured by Nacalai Tesque, Inc.) as a solvent and a catalyst.

The rate of content of phosphorus included in the obtained phosphoric acid esterified cellulose acetate was 4.5 mass %, the number average molecular weight Mn was 53000, the weight-average molecular weight Mw was 146000, and the variance Mw/Mn was 2.75.

—Manufacture of a Fire Retardant Resin Composition—

90 parts by mass of the polylactic acid (A1) (LACEA H-100J manufactured by Mitsui Chemicals, Inc., with a number average molecular weight of 52200) as the thermoplastic resin (A) and 10 parts by mass of the phosphoric acid esterified cellulose acetate (B6), to be 100 parts by mass, were dry-blended. Then, by using a biaxial kneading extruder, the obtained mixture underwent melt kneading at a kneading temperature of 180° C., and thereby a molding pellet (P9) in a size of about 3 mm square was manufactured.

(Embodiment 10)

<Manufacture of Phosphorated Polysaccharide (B)>

—Synthesis of Phosphoric Acid Esterified Cellulose Propionate (B7)—

Phosphoric acid esterified cellulose propionate (B7) was synthesized by a similar method to embodiment 8 by using cellulose propionate manufactured by Scientific Polymer products, Inc. as a starting substance, using dimethyl phosphoric acid chloride (manufactured by SIGMA-ALDRICH Corp.) as an attack test reagent, and using pyridine (manufactured by Nacalai Tesque, Inc.) as a solvent and a catalyst.

The rate of content of phosphorus included in the obtained phosphoric acid esterified cellulose propionate was 2.7 mass %, the number average molecular weight Mn was 82300, the weight-average molecular weight Mw was 240000, and the variance Mw/Mn was 2.92.

—Manufacture of a Fire Retardant Resin Composition—

90 parts by mass of the polylactic acid resin (A1) (LACEA H-100J manufactured by Mitsui Chemicals, Inc., with a number average molecular weight of 52200) as the thermoplastic resin (A) and 10 parts by mass of the phosphoric acid esterified cellulose propionate (B7) synthesized as described above, to be 100 parts by mass, were dry-blended. Then, by using a biaxial kneading extruder, the obtained mixture underwent melt kneading at a kneading temperature of 180° C., and thereby a molding pellet (P10) in a size of about 3 mm square was manufactured.

(Embodiment 11)

<Manufacture of Phosphorated Polysaccharide (B)>

—Synthesis of Phosphoric Acid Esterified Cellulose Acetate (B8)—

Phosphoric acid esterified cellulose acetate (B8) was synthesized by a similar method to embodiment 8 by using cellulose acetate (manufactured by SIGMA-ALDRICH Corp.) as a starting substance, using dimethyl phosphoric acid chloride (manufactured by SIGMA-ALDRICH Corp.) as an attack test reagent, and using pyridine (manufactured by Nacalai Tesque, Inc.) as a solvent and a catalyst.

The rate of content of phosphorus included in the obtained phosphoric acid esterified cellulose acetate was 3.1 mass %, the number average molecular weight Mn was 51600, the weight-average molecular weight Mw was 157900, and the variance Mw/Mn was 3.06.

—Manufacture of a Fire Retardant Resin Composition—

90 parts by mass of the polylactic acid resin (A1) (LACEA H-100J manufactured by Mitsui Chemicals, Inc., with a number average molecular weight of 52200) as the thermoplastic resin (A) and 10 parts by mass of the phosphoric acid esterified cellulose acetate (B8), to be 100 parts by mass, were dry-blended. Then, by using a biaxial kneading extruder, the obtained mixture underwent melt kneading at a kneading temperature of 180° C., and thereby a molding pellet (P11) in a size of about 3 mm square was manufactured.

(Embodiment 12)

—Manufacture of a Fire Retardant Resin Composition—

70 parts by mass of the polylactic acid resin (A1) (LACEA H-100J manufactured by Mitsui Chemicals, Inc., with a number average molecular weight of 52200) as the thermoplastic resin (A) and 30 parts by mass of the phosphoric acid esterified cellulose propionate (B5) manufactured in embodiment 1, to be 100 parts by mass, were dry-blended. Then, by using a biaxial kneading extruder, the obtained mixture underwent melt kneading at a kneading 1.0 temperature of 180° C., and thereby a molding pellet (P12) in a size of about 3 mm square was manufactured.

(Embodiment 13)

—Manufacture of a Fire Retardant Resin Composition—

50 parts by mass of the polylactic acid resin (A1) (LACEA H-100J manufactured by Mitsui Chemicals, Inc., with a number average molecular weight of 52200) as the thermoplastic resin (A) and 50 parts by mass of phosphoric acid esterified cellulose propionate (B5) manufactured in embodiment 1, to be 100 parts by mass, were dry-blended. Then, by using a biaxial kneading extruder, the obtained mixture underwent melt kneading at a kneading temperature of 180° C., and thereby a molding pellet (P13) in a size of about 3 mm square was manufactured.

(Embodiment 14)

—Manufacture of a Fire Retardant Resin Composition—

45 parts by mass of the polylactic resin (A1) (LACEA H-100J manufactured by Mitsui Chemicals, Inc., with a number average molecular weight of 52200) and 45 parts by mass of the polycarbonate resin (A2) (LEXAN101 manufactured by SABIC Innovative Plastics Holding BV, with a number average molecular weight of 21400) as the thermoplastic resin (A), and 10 parts by mass of the phosphoric acid esterified cellulose propionate (B5) synthesized in embodiment 8 as the phosphorated polysaccharide (B), to be 100 parts by mass, were dry-blended. Then, by using a biaxial kneading extruder, the obtained mixture underwent melt kneading at a kneading temperature of 180° C., and thereby a molding pellet (P14) in a size of about 3 mm square was manufactured.

(Embodiment 15)

—Manufacture of a Fire Retardant Resin Composition—

90 parts by mass of the polyethylene terephthalate resin (A3) (Mitsui PETJ120 manufactured by Mitsui Chemicals, Inc., with a number average molecular weight of 38300) as the thermoplastic resin (A) and 10 parts by mass of the phosphoric acid esterified cellulose propionate (B5) synthesized in embodiment 8 as the phosphorated polysaccharide (B), to be 100 parts by mass, were dry-blended. Then, by using a biaxial kneading extruder, the obtained mixture underwent melt kneading at a kneading temperature of 180° C., and thereby a molding pellet (P15) in a size of about 3 mm square was manufactured.

COMPARISON EXAMPLE 1

—Manufacture of a Resin Composition—

In embodiment 1, only 100 parts by mass of the polylactic acid resin (A1) was used as the thermoplastic resin (A), thereby a molding pellet (P16) was manufactured.

COMPARISON EXAMPLE 2

—Manufacture of a Fire Retardant Resin—Composition 20 parts by mass of phosphoric acid ester fire retardant (C1) were added into 80 parts by mass of polylactic acid (A1) (LACEA H-100J manufactured by Mitsui Chemicals, Inc., with a number average molecular weight of 52200) as the thermoplastic resin (A). The obtained mixture then underwent melt kneading at a temperature of 180° C. by using a biaxial kneading extruder, and thereby a molding pellet (P17) in a size of about 3 mm square was manufactured.

Here, an aromatic condensed phosphoric acid ester fire retardant PX-200 manufactured by DAIHACHI CHEMICAL INDUSTRY CO., LTD. was used as the phosphoric acid ester fire retardant.

COMPARISON EXAMPLE 3

—Manufacture of a Fire Retardant Resin Composition—

40 parts by mass of the polylactic acid (A1) (LACEA H-100J manufactured by Mitsui Chemicals, Inc., with a number average molecular weight of 52200) as the thermoplastic resin (A) and 60 parts by mass of the diethyl thiophosphorylated cellulose propionate (B1) manufactured in embodiment 1 were mixed; thereby a molding pellet (P18) in a size of about 3 mm square was manufactured by a similar method to that of embodiment 1.

COMPARISON EXAMPLE 4

<Manufacture of Phosphorated Polysaccharide (B)>
—Synthesis of Diethyl Thiophosphorylated Cellulose Acetate (B9)—

Cellulose acetate manufactured by Scientific Polymer products, Inc. was refined and used as a starting substance. Diethyl thiophosphorylated cellulose acetate (B9) was synthesized by a similar method to embodiment 1 by using 2 eq/AGU of diethyl thiophosphoric acid chloride (manufactured by SIGMA-ALDRICH Corp.) as an attack test reagent and pyridine (manufactured by Nacalai Tesque, Inc.) as a solvent.

The rate of content of phosphorus in the obtained diethyl thiophosphorylated cellulose acetate was 0.7 mass %, the number average molecular weight Mn was 49800, the weight-average molecular amount Mw was 140000, and the variance Mw/Mn was 2.81.

—Manufacture of a Resin Composition—

90 parts by mass of the polylactic acid (A1) (LACEA H-100J manufactured by Mitsui Chemicals, Inc., with a number average molecular weight of 52200) as the thermoplastic resin (A) and 10 parts by mass of the diethyl thiophosphorylated cellulose acetate (B9) as the phosphorated polysaccharide (B), to be 100 parts by mass, were dry-blended. Then, by using a biaxial kneading extruder, the obtained mixture underwent melt kneading at a kneading temperature of 180° C., and thereby a molding pellet (P19) in a size of about 3 mm square was manufactured.

COMPARISON EXAMPLE 5

—Manufacture of a Fire Retardant Resin Composition—

40 parts by mass of the polylactic acid resin (A1) (LACEA H-100J manufactured by Mitsui Chemicals, Inc., with a number average molecular weight of 52200) as the thermoplastic resin (A) and 60 parts by mass of the phosphoric acid esterified cellulose propionate (B5) manufactured in embodiment 1 were dry-blended. Then, by using a biaxial kneading extruder, the obtained mixture underwent melt kneading at a kneading temperature of 180° C., and thereby a molding pellet (P20) in a size of about 3 mm square was manufactured.

COMPARISON EXAMPLE 6

<Manufacture of Phosphorated Polysaccharide (B)>
—Synthesis of Phosphoric Acid Ester Cellulose Acetate (B10)—

Phosphoric acid esterified cellulose acetate (B10) was synthesized by a similar method to embodiment 8 by using cellulose acetate (manufactured by SIGMA-ALDRICH Corp.) as a starting substance, using 2 eq/AGU of diethyl phosphoric acid chloride (manufactured by SIGMA-ALDRICH Corp.) as an attack test reagent, and using pyridine (manufactured by Nacalai Tesque, Inc.) as a solvent and a catalyst.

The rate of content of phosphorus in the obtained phosphoric acid esterified cellulose acetate was 0.6 mass %, the number average molecular weight Mn was 50600, the weight-average molecular weight Mw was 170000, and the variance Mw/Mn was 3.36.

—Manufacture of a Resin Composition—

90 parts by mass of the polylactic acid resin (A1) (LACEA H-100J manufactured by Mitsui Chemicals, Inc., with a number average molecular weight of 52200) as the thermoplastic resin (A) and 10 parts by mass of the phosphoric acid esterified cellulose acetate (B10) as the phosphorated polysaccharide (B), to be 100 parts by mass, were dry-blended. Then, by using a biaxial kneading extruder, the obtained resin underwent melt kneading at a kneading temperature of 180° C., and thereby a molding pellet (P21) in a size of about 3 mm square was manufactured.

Next, a UL94 vertical burning test, an Izod impact test, and an evaluation of moldability of each formed pellet of embodiments 1 through 15 and comparison examples 1 through 6 were performed. Results of these tests and evaluations are shown in Tables 1-1, 1-2, 1-3, 1-4, 1-5, and 1-6.

<UL94 Vertical Burning Test>
—Manufacture of a UL94 Vertical Burning Test Piece—

Each manufactured pellet underwent 12 hours of drying at 50° C. by using a shelf-type hot air drier and then a process by an electric injection molding apparatus with clamp capacity of 50 tons with conditions of a molding temperature at 40° C., a cylinder temperature at 180° C., an injection speed at 20 mm/sec, an injection pressure at 100 MPa, and a cooling time of 60 seconds; thereby strip test pieces for the UL94 vertical burning test were manufactured. The size of each strip test piece manufactured by injection molding with the above-described conditions was a width of 13 mm, a length of 125 mm, and a thickness of 1.6 mm.

—UL94 Vertical Burning Test Method—

The manufactured strip test piece underwent aging at 50° C. for 72 hours. After the aging, a vertical burning test compliant with the UL94 standard was performed with humidity of 20% RH.

The test was performed by clamping a top end part of the strip test piece to be held vertically, placing absorbent cotton (with a weight of 0.8 g or less and in a size of 50 mm square) 300±10 mm below a bottom end part of the strip test piece, and checking a molten material falling onto the absorbent cotton. A first contact of the flame of a burner to the bottom end part of the strip test piece was performed for 10±1 seconds and the burner was separated from the strip test piece at a speed of about 300 mm/sec. When the burning ended, the burner was quickly returned to the bottom end part of the strip test piece to perform a second contact of its flame for 10±1 seconds.

The contacts of flame were performed 10 times in total for a set of five strip test pieces to record burning times of the strip test pieces. The burning time is a time during which burning continues after the flame is separated from the strip test piece. A first burning time was recorded as t1, a second burning time was recorded as t2, and a third time, during which a small fire (such as fire of embers) remaining after the first and second burning continues burning, was recorded as t3.

—Judgment of UL94 Vertical Burning Test—

A judgment method of the vertical burning test according to the UL94 standard is as follows.

(1) When the time t1 or t2, during which each strip test piece continued burning after the flame was separated, was 10 seconds or less, a condition "V-0" is satisfied, while a condition "V-1" or "V-2" is satisfied when t1 or t2 is 30 seconds or less.

(2) When a burning continuous time t1+t2 of all of the five strip test pieces was 50 seconds or less, the condition "V-0" is satisfied while condition "V-1" or "V-2" is satisfied when t1+t2 of all of the five strip test pieces was 250 seconds or less.

(3) When a total time of the burning continuing time t2 after the second contact of flame and a remaining fire continuing time t3 after the second burning time, which is t2+t3, was 30 seconds or less, the condition "V-0" is satisfied while the condition "V-1" or "V-2" is satisfied when t2+t3 is 60 seconds or less.

(4) Burning that burns even the clamp did not occur.

(5) When the absorbent cotton did not catch fire by burned matter or fallen matter which has been burned, the condition "V-0" or "V-1" is satisfied, while the condition "V-2" is satisfied when the absorbent cotton caught fire.

A pellet which satisfies the conditions "V-0", "V-1", and "V-2" of the above (1) through (5) is judged.

<Izod Impact Test>

—Manufacture of a Test Piece for Izod Impact Test—

Each manufactured pellet underwent 12 hours of drying at 50° C. by using a shelf-type hot air drier and then a process by an electric injection molding apparatus with clamp capacity of 50 tons with conditions of a molding temperature at 40° C., a cylinder temperature at 180° C., an injection speed at 20 mm/sec, an injection pressure at 100 MPa, and a cooling time for 60 seconds; thereby a test piece for the Izod impact test was manufactured. A 2-A type test piece having an A-notch and a size 2, with a width of 12.7 mm, a length of 64 mm, and a thickness of 12.7 mm was manufactured by injection molding with the above-described conditions.

—Izod Impact Test—

An Izod impact test compliant with JIS K7110 was performed.

[Evaluation Standards]

○: 4.0 kJ/m$^2$ or more of Izod impact strength

Δ: equal to or more than 2.5 kJ/m$^2$ and less than 4.0 kJ/m$^2$ of Izod impact strength X: less than 2.5 kJ/m$^2$ of Izod impact strength <Moldability>

Each resin composition was evaluated by the following standards, in fluidity in injection molding, releasability from the mold, and an exterior obtained by molding transfer.

[Evaluation Standards]

(1) There is no sink mark observed on a molded body.

(2) There is no shortage (unfilled part) observed at an end part of a molded body.

(3) There is no transfer defect on an uneven surface of a molded body.

(4) There is no release defect of a molded body caused in the molding process.

[Judgment Standards]

○: All of the four standards above are satisfied.

X: One or more of the four standards above is not satisfied.

TABLE 1-1

|  |  | Embodiment 1 | Embodiment 2 | Embodiment 3 | Embodiment 4 |
|---|---|---|---|---|---|
| Thermoplastic resin (A) | (A1) | 90 parts by mass | 90 parts by mass | 90 parts by mass | 90 parts by mass |
|  | (A2) | — | — | — | — |
|  | (A3) | — | — | — | — |
| Phosphorated polysaccharide (B) | (B1) | 10 parts by mass | — | — | — |
|  | (B2) | — | 10 parts by mass | — | — |
|  | (B3) | — | — | 10 parts by mass | — |
|  | (B4) | — | — | — | 10 parts by mass |
| Petroleum-based phosphoric acid ester fire retardant (C) | (C1) | — | — | — | — |
| Rate (mass %) of phosphorus content in (B) |  | 4.3 | 3.7 | 4.8 | 4.1 |
| Rate (mass %) of plant-derived material content in (A) + (B) + (C) |  | 94.2 | 95.1 | 94.8 | 94.9 |
| Izod impact strength (kJ/m$^2$) |  | 2.5 to 3.3; Δ | 2.7 to 3.4; Δ | 2.6 to 3.4; Δ | 2.5 to 3.2; Δ |
| Moldability |  | ○ | ○ | ○ | ○ |
| Fire retardancy (UL94 standard) |  | V-2 | V-2 | V-2 | V-2 |

TABLE 1-2

|  |  | Embodiment 5 | Embodiment 6 | Embodiment 7 |
|---|---|---|---|---|
| Thermoplastic resin (A) | (A1) | 50 parts by mass | 45 parts by mass | — |
|  | (A2) | — | 45 parts by mass | — |
|  | (A3) | — | — | 90 parts by mass |
| Phosphorated polysaccharide (B) | (B1) | 50 parts by mass | 10 parts by mass | 10 parts by mass |
|  | (B2) | — | — | — |
|  | (B3) | — | — | — |
|  | (B4) | — | — | — |
| Petroleum-based phosphoric acid ester fire retardant (C) | (C1) | — | — | — |

TABLE 1-2-continued

|  | Embodiment 5 | Embodiment 6 | Embodiment 7 |
|---|---|---|---|
| Rate (mass %) of phosphorus content in (B) | 4.3 | 4.3 | 4.3 |
| Rate (mass %) of plant-derived material content in (A) + (B) + (C) | 72.0 | 49.4 | 4.4 |
| Izod impact strength (kJ/m$^2$) | 4.1 to 5.3; ○ | 4.8 to 5.8; ○ | 3.7 to 4.5; Δ |
| Moldability | ○ | ○ | ○ |
| Fire retardancy (UL94 standard) | V-2 | V-2 | V-2 |

TABLE 1-3

|  |  | Embodiment 8 | Embodiment 9 | Embodiment 10 | Embodiment 11 |
|---|---|---|---|---|---|
| Thermoplastic resin (A) | (A1) | 90 parts by mass | 90 parts by mass | 90 parts by mass | 90 parts by mass |
|  | (A2) | — | — | — | — |
|  | (A3) | — | — | — | — |
| Phosphorated polysaccharide (B) | (B5) | 10 parts by mass | — | — | — |
|  | (B6) | — | 10 parts by mass | — | — |
|  | (B7) | — | — | 10 parts by mass | — |
|  | (B8) | — | — | — | 10 parts by mass |
| Petroleum-based phosphoric acid ester fire retardant (C) | (C1) | — | — | — | — |
| Rate (mass %) of phosphorus content in (B) |  | 3.2 | 4.5 | 2.7 | 3.1 |
| Rate (mass %) of plant-derived material content in (A) + (B) + (C) |  | 94.4 | 95.1 | 94.8 | 94.9 |
| Izod impact strength (kJ/m$^2$) |  | 2.6 to 3.3; Δ | 2.6 to 3.2; Δ | 2.7 to 3.4; Δ | 2.5 to 3.3; Δ |
| Moldability |  | ○ | ○ | ○ | ○ |
| Fire retardancy (UL94 standard) |  | V-2 | V-2 | V-2 | V-2 |

TABLE 1-4

|  |  | Embodiment 12 | Embodiment 13 | Embodiment 14 | Embodiment 15 |
|---|---|---|---|---|---|
| Thermoplastic resin (A) | (A1) | 70 parts by mass | 50 parts by mass | 45 parts by mass | — |
|  | (A2) | — | — | 45 parts by mass | — |
|  | (A3) | — | — | — | 90 parts by mass |
| Phosphorated polysaccharide (B) | (B5) | 30 parts by mass | 50 parts by mass | 10 parts by mass | 10 parts by mass |
|  | (B6) | — | — | — | — |
|  | (B7) | — | — | — | — |
|  | (B8) | — | — | — | — |
| Petroleum-based phosphoric acid ester fire retardant (C) | (C1) | — | — | — | — |
| Rate (mass %) of phosphorus content in (B) |  | 3.2 | 3.2 | 3.2 | 3.2 |
| Rate (mass %) of plant-derived material content in (A) + (B) + (C) |  | 83.2 | 72.0 | 49.4 | 4.4 |
| Izod impact strength (kJ/m$^2$) |  | 3.4 to 4.2; ○ | 4.2 to 5.1; ○ | 4.7 to 5.8; ○ | 3.8 to 4.6; ○ |
| Moldability |  | ○ | ○ | ○ | ○ |
| Fire retardancy (UL94 standard) |  | V-2 | V-2 | V-2 | V-2 |

TABLE 1-5

|  |  | Comparison example 1 | Comparison example 2 | Comparison example 3 |
|---|---|---|---|---|
| Thermoplastic resin (A) | (A1) | 100 parts by mass | 80 parts by mass | 40 parts by mass |
|  | (A2) | — | — | — |
| Phosphorated polysaccharide (B) | (B1) | — | — | 60 parts by mass |
|  | (B2) | — | — | — |
|  | (B3) | — | — | — |
|  | (B4) | — | — | — |
| Petroleum-based phosphoric acid ester fire retardant (C) | (C1) | — | 20 parts by mass | — |
| Rate (mass %) of phosphorus content in (B) |  | — | — | 4.3 |

TABLE 1-5-continued

|  | Comparison example 1 | Comparison example 2 | Comparison example 3 |
|---|---|---|---|
| Rate (mass %) of plant-derived material content in (A) + (B) + (C) | 100 | 80 | 66.4 |
| Izod impact strength (kJ/m$^2$) | 1.7 to 2.2; X | 1.3 to 1.6; X | 4.5 to 5.4; ○ |
| Moldability | ○ | ○ | X |
| Fire retardancy (UL94 standard) | NG | V-2 | V-2 |

TABLE 1-6

|  |  | Comparison example 4 | Comparison example 5 | Comparison example 6 |
|---|---|---|---|---|
| Thermoplastic resin (A) | (A1) | 90 parts by mass | 40 parts by mass | 90 parts by mass |
|  | (A2) | — | — | — |
| Phosphorated polysaccharide (B) | (B5) | — | 60 parts by mass | — |
|  | (B6) | — | — | — |
|  | (B7) | — | — | — |
|  | (B8) | — | — | — |
|  | (B9) | 10 parts by mass | — | — |
|  | (B10) | — | — | 10 parts by mass |
| Petroleum-based phosphoric acid ester fire retardant (C) | (C1) | — | — | — |
| Rate (mass %) of phosphorus content in (B) |  | 0.7 | 3.2 | 0.6 |
| Rate (mass %) of plant-derived material content in (A) + (B) + (C) |  | 95.2 | 66.4 | 95.2 |
| Izod impact strength (kJ/m$^2$) |  | 2.6 to 3.3; Δ | 4.3 to 5.3; ○ | 2.7 to 3.2; Δ |
| Moldability |  | ○ | X | ○ |
| Fire retardancy (UL94 standard) |  | NG | V-2 | NG |

According to the results shown in Tables 1-1 and 1-2, it was found that the fire retardant resin composition of each of embodiments 1 through 7 has a high rate of content of a plant-derived material, shock resistance, and can satisfy the fire retardancy "V-2" or higher.

By the result of embodiment 6, it was found that a polymer alloy material formed of a polycarbonate resin as a petroleum-based resin and polylactic acid can satisfy the fire retardancy "V-2" or higher, and has an improved Izod impact strength.

The thiophosphoric acid esterified cellulose propionate of embodiment 2 formed by using the cellulose propionate as a starting substance exhibited a shorter burning time than the thiophosphoric acid esterified cellulose acetate of embodiments 3 and 4. Therefore, it was found that cellulose propionate exhibits higher fire retardancy than cellulose acetate.

According to the results shown in Tables 1-3 and 1-4, it was found that the pellet formed of a fire retardant resin composition of each of embodiments 8 through 15 can satisfy the fire retardancy "V-2" or higher with a high rate of content of a plant-derived material. Moreover, the Izod impact strength was 3 kJ/m$^2$ or higher in the case where 10 parts by mass of the phosphorated polysaccharide were added, and 4 to 5 kJ/m$^2$ in the case where 30 parts by mass or more of the phosphorated polysaccharide were added. Thus, high shock resistance was obtained in these cases.

By the result of embodiment 14, it was found that a polymer alloy material formed of a polycarbonate resin as a petroleum-based resin and a polylactic acid resin can satisfy the fire retardancy "V-2" or higher, and has an improved Izod impact strength.

The phosphoric acid esterified cellulose propionate of embodiment 10 formed by using the cellulose propionate as a starting substance exhibited a shorter burning time than the phosphoric acid esterified cellulose acetate of embodiments 9 and 11. Therefore, it was found that cellulose propionate exhibits higher fire retardancy than cellulose acetate.

On the contrary, the rate of content of a plant-derived material in the fire retardant resin composition of comparison example 1 is 100%; however, it did not exhibit fire retardancy and had poor shock resistance.

The fire retardant resin composition of comparison example 2 exhibited fire retardancy but the rate of content of a plant-derived material in it was as low as 80% and had poor shock resistance.

The fire retardant resin composition of comparison example 3 exhibited fire retardancy but had poor fluidity. Therefore, there was such a problem of releasability from the mold that a runner is taken by the mold. Thus, this fire retardant resin composition of was evaluated to have a poor moldability.

The fire retardant resin composition of comparison example 4 has a rate of content of phosphorus in phosphorated polysaccharide as low as 0.7 mass %. Therefore, fire retardancy was not obtained from this resin composition.

The fire retardant resin composition of comparison example 5 exhibited fire retardancy but had poor fluidity. Therefore, there was such a problem of releasability from the mold in that a runner is taken by the mold. Thus, this fire retardant resin composition was evaluated to have a poor moldability.

The fire retardant resin composition of comparison example 6 had a rate of content of phosphorus in phosphorated polysaccharide as low as 0.6 mass %. Therefore, fire retardancy was not obtained from this resin composition.

A fire retardant resin composition of an embodiment of the present invention has shock resistance, moldability, and fire retardancy. Therefore, the fire retardant resin composition of an embodiment of the present invention can be widely used as a component used in an image output apparatus using an electrophotographic technique, a printing technique, or an inkjet technique such as a copier and a laser printer, an inner component of an electric and electronic apparatus such as a home electric appliance and a vehicle, and the like.

Through keen studies by the present inventors to solve the problems, they focused on a cellulose derivative of a biomass material and found that a fire retardant resin composition which has: low dependency on petroleum realized by using a phosphorated cellulose derivative having a side chain to which a thiophosphoric acid group or a phosphoric acid group is introduced as a fire retardant; shock resistance; moldability; and fire retardancy can be provided. Moreover, they found that a fire retardant resin composition having the above-described features and further having a high rate of content of plant-derived material and thus having a low environmental impact can be provided by adding this fire retardant to plastic formed by using a biomass material such as polylactic acid as a raw material.

According to a fire retardant resin composition of one embodiment, by adding phosphorated polysaccharide with fire retardancy which has high physical properties such as heat resistance and mechanical strength and is formed by using a biomass material as a raw material, an environmentally friendly fire retardant resin composition with an increased rate of content of the biomass material can be provided. Moreover, since the phosphorated polysaccharide having fire retardancy is a polymer material, a fire retardant resin composition in which physical properties such as heat resistance and mechanical strength of a thermoplastic resin are hardly reduced can be provided.

According to a fire retardant resin composition of one embodiment, the rate of content of phosphorus in the phosphorated polysaccharide is 1 mass % or more. Therefore, reliable fire retardancy can be obtained. At the same time, by adding phosphorated polysaccharide which has fire retardancy and high physical properties such as heat resistance and mechanical strength and is formed by using a biomass material as a raw material, an environmentally friendly fire retardant resin composition with an increased rate of content of the biomass material can be provided. Moreover, since the phosphorated polysaccharide with fire retardancy is a polymer material, a fire retardant resin composition in which physical properties such as heat resistance and mechanical strength of a thermoplastic resin are hardly reduced can be provided.

According to a fire retardant resin composition of one embodiment, an environmentally friendly fire retardant resin composition with a high rate of content of a biomass material, which is formed by using an environmentally friendly natural polysaccharide capable of reproduction such as cellulose or a cellulose derivative as a raw material, can be inexpensively provided.

According to a fire retardant resin composition of one embodiment, thiophosphoric acid ester or phosphoric acid ester can be easily attached to a side chain of a cellulose derivative due to high solvent solubility and high chemical reactivity of the cellulose derivative. Therefore, a resin composition having an increased rate of content of phosphorus with a high fire retardant performance can be provided.

According to a fire retardant composition of one embodiment, thiophosphoric acid ester or phosphoric acid ester is attached to each of 2-position, 3-position, and 6-position hydroxyl groups or alkyl groups in response to a substitution degree of the cellulose derivative. Accordingly, a resin composition with a high rate of content of phosphorus and a high fire retardant performance can be provided.

According to a fire retardant resin composition of one embodiment, phosphorated polysaccharide can be easily manufactured since dimethyl thiophosphoric acid, diethyl thiophosphoric acid, dimethyl phosphoric acid, or diethyl phosphoric acid can be obtained as an inexpensive test reagent and has less steric hindrance and does not spoil reactivity when attached to a side chain of natural phosphorated polysaccharide or a derivative thereof.

According to a fire retardant composition of one embodiment, an environmentally friendly fire retardant resin composition with an increased rate of content of a biomass material can be provided.

According to a fire retardant composition of one embodiment, a fire retardant resin composition with high physical properties such as heat resistance and mechanical strength, which is formed by using a biomass material as a raw material can be provided.

According to a fire retardant composition of one embodiment, by adding a small amount of a petroleum-derived thermoplastic resin, a fire retardant resin composition with higher physical properties such as heat resistance and mechanical strength can be provided.

According to a fire retardant composition of one embodiment, phosphorated polysaccharide has a property of a thermoplastic resin. Therefore, the phosphorated polysaccharide can be easily made into an alloy with the thermoplastic resin, and thereby a fire retardant resin composition with higher physical properties such as heat resistance and mechanical strength can be provided.

According to a molded body of one embodiment, by molding the fire retardant resin composition of an embodiment of the present invention, a fire retardant resin component in a complicated shape can be inexpensively manufactured.

According to one embodiment, the conventional problems can be solved, and a fire retardant resin composition and molded body which has low dependency on petroleum, includes a plant-derived material at a high rate, and thus has a low environmental impact, and is provided with shock resistance, moldability, and fire retardancy can be provided.

The present invention is not limited to these embodiments, but variations and modifications may be made without departing from the scope of the present invention.

The present application is based on Japanese Priority Patent Application No. 2008-174535, filed on Jul. 3, 2008, Japanese Priority Patent Application No. 2008-174536, filed on Jul. 3, 2008, Japanese Priority Patent Application No. 2009-049709, filed on Mar. 3, 2009, and Japanese Priority Patent Application No. 2009-049701, filed on Mar. 3, 2009, the entire contents of which are incorporated herein by reference.

The invention claimed is:

1. A fire retardant resin composition comprising:
a thermoplastic resin; and
a fire retardant,
wherein the fire retardant is formed of a phosphorated polysaccharide that is formed by attaching a thiophosphoric acid ester to a side chain of a natural polysaccharide, and
wherein the natural polysaccharide is cellulose propionate.

2. The fire retardant resin composition as claimed in claim 1, wherein a rate of a content of phosphorus in the phosphorated polysaccharide is 1 to 20 mass %, and a mass ratio of the thermoplastic resin and the phosphorated polysaccharide is 50 : 50 to 90 : 10.

3. The fire retardant resin composition as claimed in claim 1, wherein the thiophosphoric acid ester is attached to each of a 2-position, a 3-position, and a 6-position hydroxyl group the cellulose propionate to constitute a thiophosphoric acid ester structure.

4. The fire retardant resin composition as claimed in claim 1, wherein one selected from a group consisting of dimethyl thiophosphoric acid and diethyl thiophosphoric acid is used as the thiophosphoric acid ester.

5. The fire retardant resin composition as claimed in claim 1, wherein an aliphatic polyester is used as the thermoplastic resin, and said aliphatic polyester includes at least one selected from a group consisting of polylactic acid, polybutylene succinate, polycaprolactone, polytrimethylene terephthalate, and microbially produced polyhydroxyalkanoate.

6. A fire retardant resin composition comprising:
a thermoplastic resin; and
a fire retardant,
wherein the fire retardant is formed of a phosphorated polysaccharide that is formed by attaching a phosphoric acid ester to a side chain of a natural polysaccharide, and
wherein the natural polysaccharide is cellulose propionate.

7. The fire retardant resin composition as claimed in claim 6, wherein a rate of a content of phosphorus in the phosphorated polysaccharide is 1 to 20 mass %, and a mass ratio of the thermoplastic resin and the phosphorated polysaccharide is 50 : 50 to 90 : 10.

8. The fire retardant resin composition as claimed in claim 6, wherein the phosphoric acid ester is attached to each of a 2-position, a 3-position, and a 6-position hydroxyl group of the cellulose propionate to constitute a phosphoric acid ester structure.

9. The fire retardant resin composition as claimed in claim 6, wherein one selected from a group consisting of dimethyl phosphoric acid and diethyl phosphoric acid is used as the phosphoric acid ester.

10. The fire retardant resin composition as claimed in claim 6, wherein an aliphatic polyester is used as the thermoplastic resin, and said aliphatic polyester includes at least one selected from a group consisting of a polylactic acid, polybutylene succinate, polycaprolactone, polytrimethylene terephthalate, and microbially produced polyhydroxyalkanoate.

* * * * *